W. M. KENNALEY.
FENCE STRETCHER.
APPLICATION FILED JULY 19, 1919.

1,370,318.

Patented Mar. 1, 1921.

INVENTOR
W. M. KENNALEY,
BY
Milton S. Crandall,
ATTORNEY

UNITED STATES PATENT OFFICE.

WILLIAM M. KENNALEY, OF DANBURY, IOWA.

FENCE-STRETCHER.

1,370,318.

Specification of Letters Patent.

Patented Mar. 1, 1921.

Application filed July 19, 1919. Serial No. 312,017.

*To all whom it may concern:*

Be it known that I, WILLIAM M. KENNALEY, a citizen of the United States, and a resident of Danbury, in the county of Woodbury and State of Iowa, have invented certain new and useful Improvements in Fence-Stretchers, of which the following is a specification.

The invention has for its primary object the production of a device for stretching fence wire with a minimum amount of power and adapted to be readily adjusted to suit any height of fencing.

Another object of the invention is the production of a fence stretching device so constructed as to be readily adjusted and readily portable.

Furthermore the invention aims to provide a fence stretching device inexpensive yet durable in construction and embodying a minimum number of parts.

With these and other objects in view, the invention consisting in the construction, combination and novel arrangement of parts, will be fully understood from the following description, reference being had to the accompanying drawing, which forms a part of this application and in which like characters of reference indicate corresponding parts throughout the several views, of which,—

Figure 1:
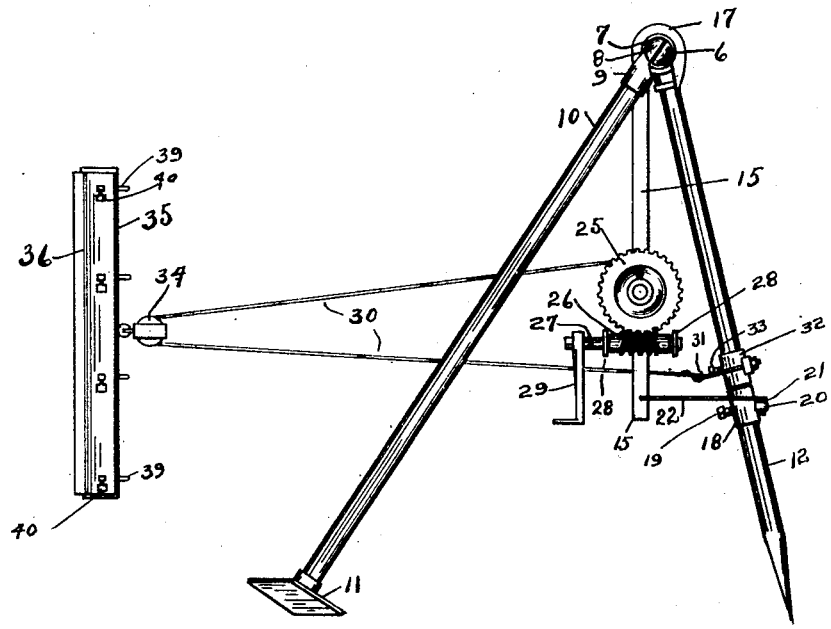
Figure 1 is a side elevation of the device constructed in accordance with the invention.
Figure 3:
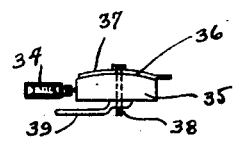
Fig. 3 is a plan of the fence-wire drawbar.
Figure 2:
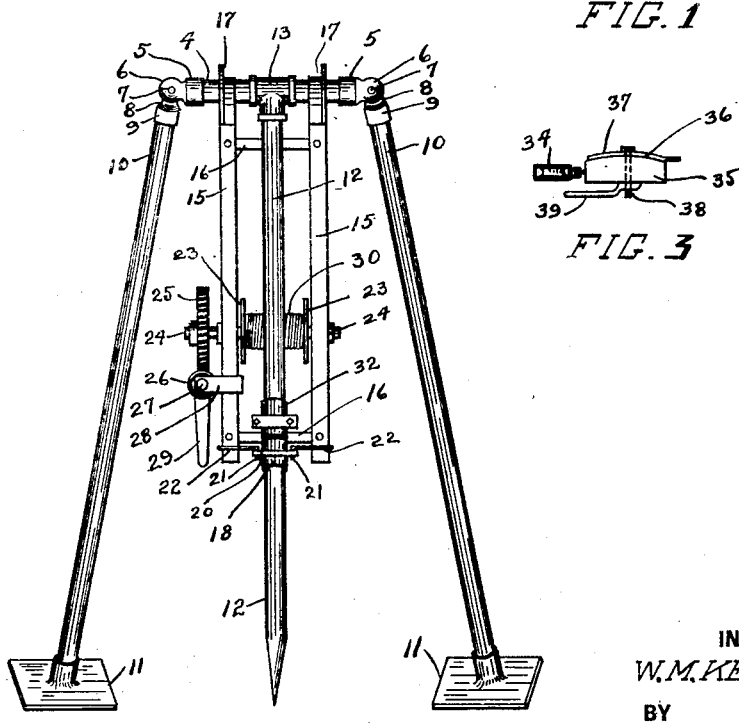
Fig. 2 is a rear elevation thereof.

In the embodiment illustrated, the superstructure includes an upper horizontal tubular cross-member, 4, the ends of which are provided with caps, 5, formed with ears, 6, to which are pivoted as at 7, similar ears, 8, formed on caps, 9, on uprights, 10, which decline forwardly and are provided with foot-plates, 11, engageable with the earth to prevent forward movement of the device. 12, is a rear upright carrying a T-fitting, 13, free to oscillate on the center of the cross-member, 4, whereby the upright or leg, 12, may be swung forwardly or rearwardly. Upon the cross-member, 4, is removably mounted the operating mechanism consisting preferably of a frame including parallel side members, 15, interconnected by upper and lower cross-members, 16, and formed at their upper ends with hooks, 17, which hang on the cross-member, 4, on opposite sides of the T-fitting, 13. 18 is a collar freely encircling the leg, 12, and adjustably secured thereon by a set-screw, 19, or otherwise. The said collar, 18, on its rear side is formed with lateral ears, 20, in which are removably inserted the hooked or downwardly bent ends, 21, of links, 22, secured to the lower end of the frame members, 15, which prevent forward and rearward movement of the operating mechanism. Between the frame members, 15, is a drum or reel, 23, fixed on a shaft, 24, journaled in the frame members, 15, and carrying a worm-wheel, 25, driven by a worm, 26, on a short shaft, 27, journaled in suitable bearings, 28, on the adjacent frame member, 15; and driven by a hand crank, 29. Upon the reel is wound a cable or other flexible element, 30, the free end of which is suitably secured as at 31, to a collar, 32, freely encircling the rear leg, 12, and adjustably secured thereto as by a set-screw, 33. The bight of the flexible element passes around a direct pulley, 34, secured to the center of the draw bar, 35, having a convex face, 36, between which and a correspondingly-shaped plate, 37, fence wire may be clamped. At intervals the bar is penetrated by bolts, 38, provided with tail-nuts, 39, engageable with the bar to firmly clamp the plate, 37, to the bar, the bar being provided with key hole slots, 40, to permit attachment and detachment of the plate to and from the bar without removal of the nuts, 39, from the bolts.

It is now evident this provides a staple means for stretching fence wire with a minimum of power and when rotation of the operating crank ceases, the worm and worm wheel prevent any retraction of the fence wire. It is also clear that the collar, 32, may be adjusted vertically to suit any height of fence. When it is desired to remove the device from place to place, the depending operating mechanism may be readily detached from the superstructure and the three legs may be swung into substantially the same plane whereby the device is easily handled and occupies very little space.

I am aware that fence stretchers embodying worm and worm wheel actuating means have been previously known and used and I do not claim such structure broadly, but what I do claim as new and desire to secure by Letters Patent of the United States, is,—

1. In a fence stretcher, a superstructure including a horizontal cross-member, legs pivoted thereon to swing toward and from each other and a center leg pivoted on the cross member to swing forwardly and rearwardly, a frame including side members removably hung on the cross-member, linkage between the frame and said center leg, and fence-stretching mechanism carried by the frame.

2. In a fence stretcher, a superstructure including a horizontal cross-member, legs pivoted thereon to swing toward and from each other and a center leg pivoted on the cross member to swing forwardly and rearwardly, a frame including side members removably hung on the cross-member, linkage between the frame and said center leg, and fence-stretching mechanism carried by the frame and including a rotatable shaft carried by the frame, a reel mounted on the shaft, a worm-wheel fixed on the shaft, a worm to drive the worm-wheel, and a flexible element wound on the reel and adapted to be secured to fencing.

3. In a fence-stretcher, a superstructure including a horizontal cross-member, oppositely inclined legs on the ends thereof, a center leg pivoted on the cross-member to swing forwardly and rearwardly, a frame including side members depending from the cross-member, braces between the frame and the center leg, a reel rotatably supported between said members, a worm-wheel on one of the members to rotate the reel, and a worm on the latter member to drive the worm-wheel.

In testimony whereof I have hereunto set my hand.

WILLIAM M. KENNALEY.